June 18, 1963     D. L. PETERS ETAL     3,093,865
INJECTION MOLDING OF PLASTIC MATERIALS Filed May 16, 1960     2 Sheets-Sheet 1

INVENTORS
D.L. PETERS
J.N. SCOTT JR.
BY Hudson and Young
ATTORNEYS

June 18, 1963　　　D. L. PETERS ETAL　　　3,093,865
INJECTION MOLDING OF PLASTIC MATERIALS
Filed May 16, 1960　　　　　　　　　　　2 Sheets-Sheet 2

INVENTORS
D. L. PETERS
J. N. SCOTT JR.
BY Hudson and Young
ATTORNEYS

United States Patent Office 3,093,865
Patented June 18, 1963

3,093,865
INJECTION MOLDING OF PLASTIC MATERIALS
Donald L. Peters and John N. Scott, Jr., Bartlesville, Okla., assignors to Phillips Petroleum Company, a corporation of Delaware
Filed May 16, 1960, Ser. No. 29,411
1 Claim. (Cl. 18—42)

This invention relates to the injection molding of thermoplastic materials. In one aspect it relates to injection molding apparatus having associated therewith a mold which includes a novel runner system. In another aspect it relates to a method for the injection molding of thermoplastic materials.

Conventional molding apparatus of the injection type usually includes an injection or heating cylinder which includes an injection plunger or cylinder. The injection plunger reciprocates in the bore of the heating cylinder in such a manner as to permit the solid plastic material to be molded to enter the cylinder on the withdrawal stroke of the plunger. On the compression stroke of the plunger, the plastic material, now in a molten state, is forced from the heating cylinder through a nozzle and thence through a runner system into the mold cavities.

The two types of molds generally used in injection molding apparatus are commonly designed as 3-plate molds and hot runner molds. Both of these types have very definite disadvantages, the elimination of which is made possible by the present invention. While of the two types of molds the 3-plate mold is considerably less expensive to construct, its cold runner system freezes off during each cycle of operation, i.e., upon the completion of each shot the plastic material solidifies in the runner system. As a result, the solidified material must be removed from the runner system before proceeding with the next shot. Therefore, with 3-plate molds, cycle times are comparatively long, materials are wasted, and any attempt to control the operation automatically is greatly complicated.

As compared to the 3-plate mold, a hot runner mold is very expensive to construct. Also, several hours are often required to line out the apparatus on a stable cycle because of temperature equilibrium difficulties encountered in balancing the mold gate cooling against the runner heat. Additional problems present in a hot runner mold operation arise because of the frequent occurrence of hot spots in the mold, which cause warpage and gate brittleness of the molded article. However, in spite of these disadvantages, hot runner systems are often preferred, particularly where the production of a large quantity of items is involved. This is the case because somewhat faster cycle times and an appreciable saving in material are obtainable with a hot runner system, and the system is also more readily adapted to an automatic cycle. In accordance with the present invention, an injection molding apparatus is provided having a mold which incorporates the advantages without any of the disadvantages of the two commonly used types of molds.

It is an object of this invention to provide an improved injection molding apparatus wherein the runner system can be adapted to molding cycles of varying length. It is an object of this invention to provide an injection molding apparatus having an insulated runner system. A further object of the invention is to provide an injection molding apparatus wherein the insulated runner system can be converted into a hot runner system. A still further object of the invention is to provide an improved method for the injection molding of thermoplastic materials. Other and further objects and advantages of the invention will become apparent to those skilled in the art upon study of this disclosure, including the detailed description of the invention and the appended drawing, wherein:

Figure 1:
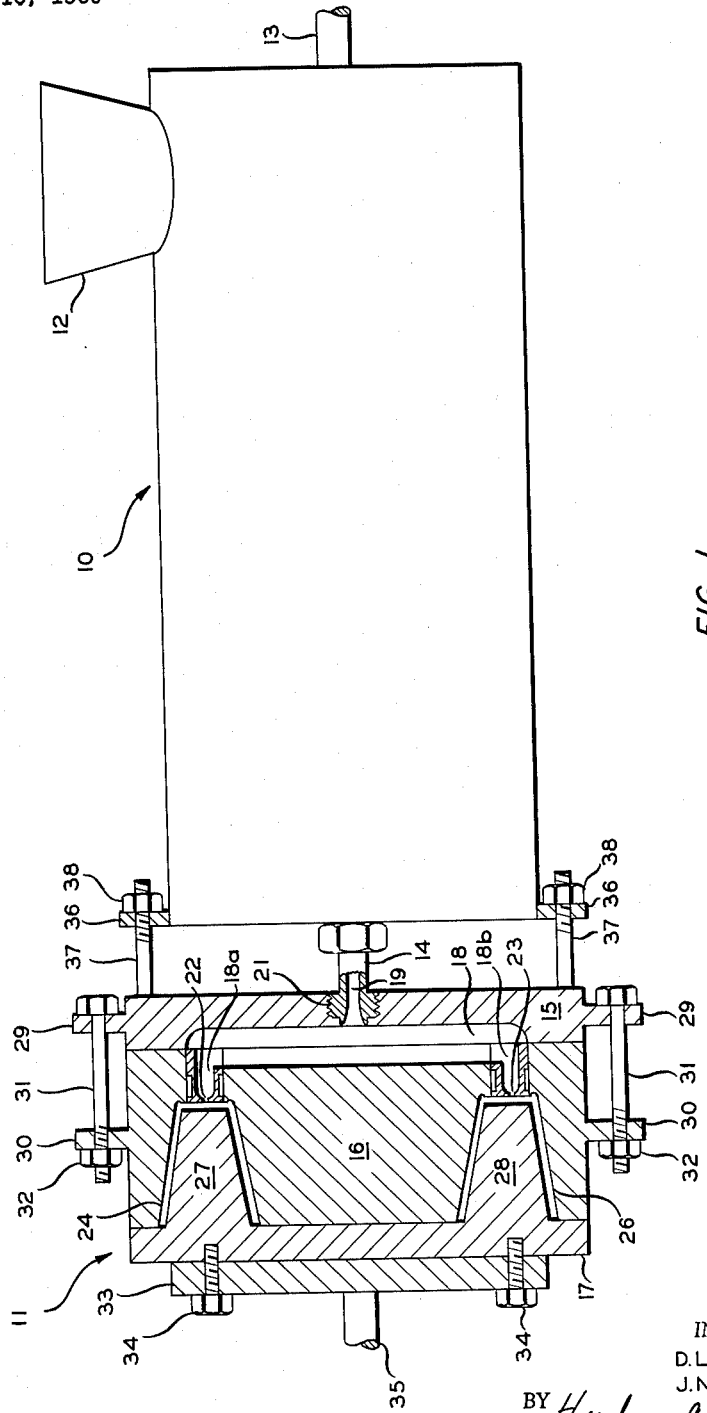
FIGURE 1 is an elevational view, partly in section, of an injection molding apparatus having embodied therein the runner system of this invention.

Broadly, the invention contemplates constructing the runner system of an injection molding apparatus so that the diameter of the runner is sufficiently great to operate as an insulated runner and having the ends of the runner turned toward the mold cavity around a 90-degree corner to within a very short distance of the bottom of the cavity so that the gate projection is so short that the molded article will require no trimming. Although the sprue connecting the runner system to the gate cavity is extremely short, the minimum taper of the sprue is approximately 14 degrees. The insulating wall of solidified thermoplastic material in the runner system is of substantially the same thickness up to the gate. The invention also contemplates positioning an internal heated cartridge in each of the right angle turn sections to supply additional heat to the molten thermoplastic near the gate so as to maintain the apparatus operable during interruptions of the operational cycle or during extremely long cycle periods, because freezing of the thermoplastic usually occurs first at or near the gate.

The materials which are molded in accordance with the present invention can be broadly defined as being thermoplastic synthetic resins. The invention is particularly applicable to materials which can be defined as high density, highly crystalline solid polymers, although low density, low crystallinity polymers can also be employed. The high density, highly crystalline solid polymers often have an inherent viscosity of at least 0.8, preferably an inherent viscosity between 1.2 and about 10, as determined from a solution of 0.2 gram of polymer in 50 cc. of tetralin at 130° C. The polymers also have a crystallinity of at least 70 percent, preferably at least 80 percent, and more desirably at least 90 percent, at 25° C. The crystallinity of the polymers can be determined by measurements of nuclear magnetic resonance (Wilson and Pake, Journal of Polymer Science, 10, 503 (1953)), using a sample of polymer which is in a state approaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by fall of about 1.5° C. per minute at 135° C. The crystallinity can also be determined according to the method of Matthews, Peiser and Richards, Acta Crystallographica, 2, 85 (1949). The softening point of the polymer will vary with the particular polymer used, increasing as the density and crystallinity of the polymer increases. Generally, the softening point of the high density solid polymer is about 250° F., preferably in the approximate range of 250 to 300° F., and is several degrees higher, e.g., about 10° F., than the melting point of the polymer.

Highly crystalline polymers having the above-described properties are preferably produced by the method described in U.S. Patent 2,825,721 of J. P. Hogan and R. L. Banks, issued on March 4, 1958. As described in detail in the Hogan and Banks patent, the polymers to be molded in accordance with the present invention can be produced by contacting an aliphatic 1-olefin with a catalyst comprising as its essential ingredient from 0.1 to 10 or more weight percent chromium in the form of chromium oxide, preferably including a substantial amount of hexavalent chromium. The chromium oxide is ordinarily associated with at least one other oxide, particularly at least one oxide selected from the group consisting of silica, alumina, zirconia, and thoria. It is preferred that the plastic materials which are to be molded in accordance with this invention be polymers of ethylene or propylene or mixtures of ethylene and other unsaturated hydrocarbons, e.g., mixtures of ethylene with minor amounts of monoolefins containing up to and including 6 carbon atoms per molecule, such as propylene, 1-butene, and 1-pentene.

While it is preferred to use in the practice of this invention polymers produced in accordance with the Hogan and Banks process, it is to be understood that polymers produced by other methods can also be employed. For example, a polymer which can be advantageously used can be produced by contacting an olefin, such as ethylene or propylene, with a catalyst comprising a mixture of an organometallic compound, such as an aluminum trialkyl, and a halide of a group IV metal of the periodic table, such as titanium tetrachloride. In another method for producing a suitable polymer, an olefin, such as ethylene, is polymerized in the presence of a catalyst comprising an organometallic halide, such as ethylaluminum dichloride, and a halide of a group IV metal, such as titanium tetrachloride. Although it is usually preferred to utilize the above-mentioned polymers, it is to be realized that the invention is broadly applicable to the molding of thermoplastic materials and that polymers such as polystyrene, polyvinyl chloride, copolymers of vinyl chloride and vinylidene chloride, nylon, and the like, can be utilized in the practice of the invention.

A more complete understanding of the invention can be obtained by referring to the drawing wherein like elements will be referred to by like numerals in the various figures.

Referring to FIGURE 1, an injection molding apparatus is shown as an elevational view, partly in section, and includes two principal components, namely heating or injection cylinder 10 and mold 11. The solid plastic material, usually in granular form, is introduced into heating cylinder 10 through hopper 12. The heating cylinder includes a heating means (not shown) for converting the solid plastic material to a molten condition. A plunger 13 reciprocates in the bore of the heating cylinder, thereby providing means for discharging the molten material through nozzle 14. Heating cylinder plunger 13 is usually connected to a hydraulic system, not shown, which provides means for moving the plunger in the bore of the heating chamber. It is to be understood that it is not intended to limit the present invention to a heating chamber or discharge nozzle of any particular construction, since any suitable heating chamber or discharge nozzle can be employed.

Mold 11 comprises three principal components which, for convenience of description, are designated as runner section 15, cavity section 16 and core section 17. These three sections correspond to the plates from which a 3-plate mold derives its name. Identical grooves or channels are formed in adjacent surfaces of the runner and cavity sections so that when the runner and cavity sections are placed together, as shown in the drawing, these grooves coincide and form runner or passageway 18. The particular runner illustrated is in the shape of a straight tube having the ends turned downwardly at an angle of 90 degrees so as to form the leg sections indicated as 18a and 18b; however, it is to be understood that runners having configurations other than a straight tube come within the scope of this invention. For example, it is within the purview of the invention to employ a runner which is in the form of a circular tube or torus having a plurality of downwardly depending leg sections such as shown as 18a and 18b.

Connecting the discharge opening in nozzle 14 to runner 18 is sprue or passageway 19. While sprue 19 is shown as being formed in insert member 21, which is threaded into runner section 15, it is to be realized that the runner section can be so machined that the sprue is an integral part of that section. Sprues or gates 22 and 23, formed in the cavity section 16, connect the runner with the mold space between the walls of cavities 24 and 26 and the surfaces of cores 27 and 28. The sprue openings into these spaces are usually referred to as the mold gates. While the mold is illustrated as including a cavity section and two cavities, it is to be understood that the invention is applicable to a mold having any desired number of cavities. It is to be noted that the sprues 22 and 23 actually amount to a gate from the runner 18 to the mold cavities.

The mold of the injection molding apparatus includes means whereby the runner, cavity and core sections can be maintained securely in position with respect to one another as well as with heating chamber 10. Thus the runner and cavity sections are provided with flanges 29 and 30. Bolts 31, having nuts 32 threaded on their ends, extend through these flanges so that runner section 15 and cavity section 16 can be locked securely together. It is to be understood that any suitable clamping device can be used to hold these two sections in position. A plate 33 is attached to core section 17 by means of bolts 34 which pass through the plate and threadably engage the core section. Connected to plate 33 is a connecting rod 35 having at its other end a hydraulic piston which rides in a hydraulic cylinder (not shown). By means of this latter arrangement of apparatus, the core section is maintained in position against the cavity section during the molding step of the cycle of operation. Upon completion of the steps of filling the mold with molten plastic and cooling sufficiently to harden the molded object, the core section is withdrawn by means of the hydraulic piston so that the molded articles can be removed from the cavities.

Heating chamber 10 is also provided with flange members 36 having openings therein in which bolts 37 ride. One end of these bolts is fixedly attached, as by welding or threaded engagement, to runner section 15 while the other end is threaded to receive nuts 38. By this arrangement of apparatus, the mold is maintained in position with respect to the heating chamber with the discharge end of nozzle 13 in communication with sprue 19.

Figure 2:
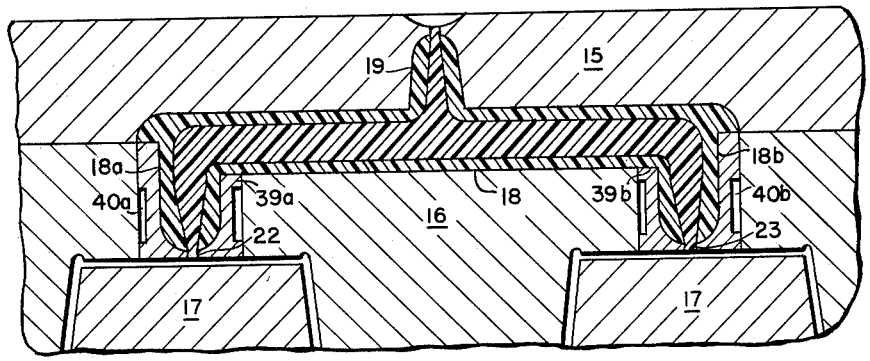
FIGURE 2 is a detail view of one embodiment of the invention.

FIGURE 2 shows the runner system of FIGURE 1 in greater detail. The turned-down end sections 18a and 18b of runner 18 can conveniently be constructed as bushings, as illustrated, or can be fashioned directly in cavity section 16. Utilizing the bushing technique facilitates incorporating provision for insulation, e.g., the air gap indicated as the annular passageways 40a and 40b. The insulating thermoplastic wall is indicated at 41 and the molten thermoplastic is indicated at 42.

Figure 3:
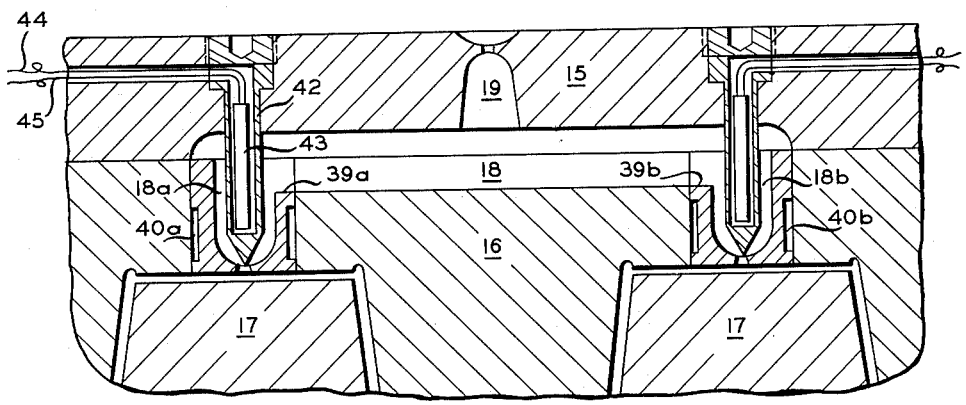
FIGURE 3 illustrates a modification of the invention.

In FIGURE 3 torpedoes 42, containing heaters 43 with lead lines 44 and 45 connected to a source of electricity (not shown), are installed in the leg sections 18a and 18b. The internally heated torpedoes 42 permit interruptions in the molding operation for a period of time equal to the maximum time the plastic will remain molten in the runner.

For molding polyethylene the runner system of this invention should be constructed so that at least about ⅛ inch of insulating polymer can be maintained on the runner wall and the remaining "working" volume of the runner will be adequate for the molding operation. For molding polystyrene and other thermoplastics having a lower specific heat and/or insulating properties inferior to polyethylene, allowance for a thicker insulating shell will be required.

When using the runner system of FIGURE 2, i.e., without any heat applied to the polymer adjacent the gate, and having the dimensions of the runners of the examples below, for molding polyethylene, the maximum residence time of the polymer in the runner is about 1 minute.

Thus, in molding small articles whose volume is less than that of the runner, the cycle time should be such that the polymer entering the runner via sprue 19 will leave the runner gates 22 and 23 in about 1 minute or less.

Where the volume of each shot is about one-half the working volume of the runner, the cycle should be at about 30 seconds or less. Where the volume of each shot is about one-fourth the working volume of the runner, the cycle should be about 15 seconds or less.

When molding polyethylene with the runner system of FIGURE 4, of the same dimensions as above, having heaters 43 in the end sections 18a and 18b, the residence time of the polymer in the runner can be as much as about 3 minutes. In each case where the volume of the molded article, or articles, is greater than that of the runner the cycle period can be as great as the maximum residence time of the polymer in the runner.

The protective insulating wall for molding thermoplastics in general will vary between about 3/32 and about 3/16 inch and allowance for appropriate insulating wall thickness should be made.

The time periods set out here apply to the specific runner systems considered and will vary with the size of the runner systems.

The following examples will be helpful in understanding the invention but are not to be construed as unduly limiting the invention.

Example I

A molding apparatus was constructed according to the illustration of FIGURE 4 wherein the runner was 3/4 inch in diameter and about 7 1/4 inches long. The end sections were 1 inch in diameter and about 1 1/4 inches long. Heating torpedoes 3/8 inch in diameter having pointed ends were installed in the end sections as shown in FIGURE 4. The apparatus was used to mold high density solid polyethylene, as described in column 2, of different colors and at different cycle periods. White polyethylene was molded with cylinder temperature of 450° F., and a cycle period of 19 seconds, that is, 19 seconds from the time one molded article was removed until the next molded article was removed. Articles were thus molded for a time sufficient to assure that the system was in equilibrium (about 5 minutes) and then red polyethylene was used to replace the white polyethylene without stopping the molding operation and the cycle time was increased to 29 seconds. The red polyethylene was then replaced with yellow polyethylene and the cycle time increased to 39 seconds. The yellow polyethylene was replaced with green polyethylene and the cycle time increased to 49 seconds and the molding operation terminated.

The mold was disassembled, after cooling, and the solidified polymer was removed and sawed in two halves, longitudinally. The total insulation, i.e., white, red and yellow, was about 1/8 inch with the white constituting about 80 to 90 percent of the total thickness.

The thickness of the protective insulating shell constitutes about 50 percent of the runner volume when solid polyethylene is being molded. The remaining 50 percent of the runner volume is the working portion of the runner and the polyethylene therein remains molten.

Example II

A similar run was made in this apparatus, molding white solid polystyrene with a cylinder temperature of 450° F. and a cycle period of 25 seconds as above described. The white polystyrene was then replaced with red polyethylene and the cycle period increased to 45 seconds and then terminated. The solidified polymer was removed from the runner and sawed in half as above described. The insulating shell thickness of the polystyrene was about 5/16 inch as compared to a polyethylene shell thickness of about 3/16 inch for substantially the same cycle time. This difference indicates the superior insulating properties of polyethylene.

The turned end sections are of larger diameter than the main runner to provide additional space for the heating torpedoes and to accommodate a larger volume of polymer when the heaters are not employed. The larger volume of polymer holds heat longer at the point where a freeze-up will first occur, i.e., at the gate to the cavity.

Reasonable variations and modifications are possible within the scope of this disclosure without departing from the spirit and scope of the invention.

That which is claimed is:

In injection molding apparatus comprising a heating means, an unheated mold containing a cavity and molten plastic discharge means for discharging molten plastic from said heating means to said mold, the combination therewith of a runner formed in said mold comprising a tubular passageway extending substantially completely from said molten plastic discharge means to said cavity, having a diameter sufficient to maintain a wall of solidified plastic of about 3/32 to about 3/16 inch in thickness surrounding a stream of molten plastic flowing through said runner and having a first portion thereof with its longitudinal axis normal to the longitudinal axis of a hereinafter named gate, a second portion of greater cross-sectional area than said first portion turned at a 90-degree angle to meet the gate, and a gate means between said runner and said cavity, the walls of said gate opening into said cavity at a diverging angle of at least 14 degrees.

References Cited in the file of this patent

UNITED STATES PATENTS

| | | |
|---|---|---|
| 2,428,315 | Lester | Sept. 30, 1947 |
| 2,814,831 | McKee | Dec. 3, 1957 |
| 2,871,517 | Allard | Feb. 3, 1959 |
| 2,878,515 | Stran | Mar. 24, 1959 |
| 2,911,680 | Kelly | Nov. 10, 1959 |
| 3,010,155 | Gilmore | Nov. 28, 1961 |
| 3,024,498 | Bronnenkant et al. | Mar. 13, 1962 |

FOREIGN PATENTS

| | | |
|---|---|---|
| 882,584 | Switzerland | Oct. 31, 1958 |